United States Patent
Savalgi et al.

(10) Patent No.: US 11,221,940 B2
(45) Date of Patent: *Jan. 11, 2022

(54) PERFORMANCE ENGINEERING

(71) Applicant: Accenture Global Solutions Limited, Dublin (IE)

(72) Inventors: Chethana Savalgi, Bengaluru (IN); Jayanti Vemulapati, Mumbai (IN)

(73) Assignee: Accenture Global Solutions Limited, Dublin (IE)

( * ) Notice: Subject to any disclaimer, the term of this patent is extended or adjusted under 35 U.S.C. 154(b) by 81 days.

This patent is subject to a terminal disclaimer.

(21) Appl. No.: 16/819,411

(22) Filed: Mar. 16, 2020

(65) Prior Publication Data

US 2020/0218632 A1 Jul. 9, 2020

Related U.S. Application Data

(63) Continuation of application No. 16/505,114, filed on Jul. 8, 2019, now Pat. No. 10,592,385.

(30) Foreign Application Priority Data

Aug. 21, 2018 (IN) .............................. 201811031336

(51) Int. Cl.
*G06F 15/16* (2006.01)
*G06F 11/34* (2006.01)
(Continued)

(52) U.S. Cl.
CPC ...... *G06F 11/3495* (2013.01); *G06F 11/3006* (2013.01); *G06F 11/3447* (2013.01); *G06N 20/00* (2019.01)

(58) Field of Classification Search
CPC ............. G06F 11/3495; G06F 11/3006; G06F 11/3447
(Continued)

(56) References Cited

U.S. PATENT DOCUMENTS 6,681,249 B2 * 1/2004 Christensen ........ G06F 11/3447
709/224
7,788,524 B2 8/2010 Wing
(Continued)

OTHER PUBLICATIONS

EP Search Report in European Application No. EP19184930, dated Jan. 8, 2020, 6 pages.
(Continued)

*Primary Examiner* — Moustafa M Meky
(74) *Attorney, Agent, or Firm* — Fish & Richardson P.C.

(57) ABSTRACT

Methods, systems, and apparatus, including computer programs encoded on a computer storage medium, for implementing performance engineering are disclosed. In one aspect, a method includes the actions of providing, to a cloud computing system that is configured to implement multiple different types of virtual computing nodes, an instruction to execute an application on a virtual computing node that is a first type of virtual computing node of the multiple different types of virtual computing nodes. The actions further include determining computing performance parameters of the virtual computing node. The actions further include determining to execute the application on both the virtual computing node and an additional virtual computing node. The actions further include selecting, from among the multiple different types of virtual computing nodes, a second type of virtual computing node. The actions further include executing the application on the virtual computing node and the additional virtual computing node.

24 Claims, 4 Drawing Sheets

(51) Int. Cl.
*G06N 20/00* (2019.01)
*G06F 11/30* (2006.01)

(58) Field of Classification Search
USPC .................................................... 709/224
See application file for complete search history.

(56) References Cited

U.S. PATENT DOCUMENTS

| | | | |
|---|---|---|---|
| 8,739,157 B2 * | 5/2014 | Ho | G06F 9/5077 |
| | | | 718/1 |
| 8,826,274 B2 * | 9/2014 | Moriki | G06F 11/3419 |
| | | | 718/1 |
| 8,893,123 B2 | 11/2014 | Miyamoto | |
| 9,444,886 B2 | 9/2016 | Rahman | |
| 9,626,710 B1 | 4/2017 | Chheda et al. | |
| 9,858,095 B2 | 1/2018 | Breitgand | |
| 9,996,442 B2 * | 6/2018 | France | G06F 11/3452 |
| 10,187,257 B2 | 1/2019 | Rahman | |
| 10,365,955 B2 * | 7/2019 | Jia | G06F 9/4856 |
| 10,503,535 B1 * | 12/2019 | Hickey | G06F 11/301 |
| 10,592,385 B1 * | 3/2020 | Savalgi | G06F 11/3495 |
| 10,791,146 B2 * | 9/2020 | Xie | H04L 63/1433 |
| 2009/0138541 A1 | 5/2009 | Wing | |
| 2011/0307889 A1 * | 12/2011 | Moriki | G06F 11/3495 |
| | | | 718/1 |
| 2012/0239739 A1 * | 9/2012 | Manglik | G06F 9/5077 |
| | | | 709/203 |
| 2014/0082612 A1 | 3/2014 | Breitgand | |
| 2016/0080207 A1 | 3/2016 | Prakash | |
| 2016/0094641 A1 | 3/2016 | Rahman | |
| 2016/0352571 A1 | 12/2016 | Rahman | |
| 2018/0123912 A1 * | 5/2018 | Bryant | G06Q 10/0631 |
| 2018/0324219 A1 * | 11/2018 | Xie | H04L 63/0209 |
| 2019/0158357 A1 | 5/2019 | Rahman | |
| 2020/0065216 A1 | 2/2020 | Savalgi | |
| 2020/0177518 A1 * | 6/2020 | Jain | H04L 47/82 |

OTHER PUBLICATIONS

Gui et al., "A Service Brokering and Recommendation Mechanism for Better Selecting Cloud Services", Plos One, 9(8), Aug. 29, 2014, 20 pages.

Qiu et al., "A deep learning approach for VM workload prediction in the cloud", 17th IEEE/ACIS International Conference on Software Engineering, Artificial Intelligence, Networking and Parallel/Distributed Computing, May 30, 2016, pp. 319-324.

Zhang et al., "A Novel QoS Prediction Approach for Cloud Service Based on Bayesian Networks Model", IEEE International Conference on Mobile Services, Jun. 27, 2016, pp. 111-118.

IN Office Action in Indian Appln. No. 201811031336, dated Jun. 11, 2021, 7 pages.

Luo et al., "A Resource Scheduling Algorithm of Cloud Computing based on Energy Efficient Optimization Methods ," Presented at Proceedings of the 2012 International Green Computing Conference, San Jose, CA, USA, Jun. 4-8, 2012, 6 pages.

\* cited by examiner

PERFORMANCE ENGINEERING

CROSS-REFERENCE TO RELATED APPLICATIONS

This application is a continuation of U.S. application Ser. No. 16/505,114, filed Jul. 8, 2019, which claims priority to Indian Patent Application No. 201811031336, filed on Aug. 21, 2018. Both of these prior applications are incorporated by reference in their entirety.

TECHNICAL FIELD

This specification generally relates to machine learning and cloud computing.

BACKGROUND

Machine learning is related to the study and construction of algorithms that can learn from and make predictions on data. The algorithms may overcome following strictly static program instructions by making data-driven predictions or decisions through building a model from sample inputs.

Cloud computing is an information technology paradigm that enables access to shared pools of configurable system resources and higher-level services that can be rapidly provisioned with minimal management effort, often over the Internet. Cloud computing relies on sharing of resources to achieve coherence and economies of scale.

SUMMARY

When a user employs a cloud computing service to execute an application, it may be difficult for the user to ensure that user is using the cloud computing service in the most efficient manner. The cloud computing service may offer various types of virtual computing nodes and each type may have different models. A user may be tempted to select some of the more powerful types of virtual computing nodes to ensure that performance of the application does not suffer. However, this may be unnecessary given the user's requirements and may not be an optimal use of computing resources. Additionally, the computing demands of the application may not be constant over time. For example, during some periods many users may typically access the application, and during other periods fewer users may typically access the application.

To ensure that the user selects the proper virtual computing nodes for the application, a system may access a series of benchmark configurations executed on various combinations of virtual computing nodes. The system may identify the combination of virtual computing nodes for the application by examining the performance of each combination of virtual computing nodes while executing the benchmark configurations. Once the user deploys the application on the virtual computing nodes, the system may continuously monitor the performance of the virtual computing nodes. The system may adjust the types and models of virtual computing nodes executing the application as the demands of the application change. For example, the system may add a specific type of virtual computing node to fit the particular stress that the application is putting on the virtual computing nodes. At a later point in time, the system may remove a specific type of virtual computing node from the virtual computing nodes if there is a glut of a particular computing resource.

According to an innovative aspect of the subject matter described in this application, a method for implementing performance engineering includes the actions of providing, by a computing device and to a cloud computing system that is configured to implement multiple different types of virtual computing nodes, an instruction to execute an application on a virtual computing node that is a first type of virtual computing node of the multiple different types of virtual computing nodes; monitoring, by the computing device, performance of the virtual computing node while the virtual computing node executes the application and while users interact with the application; based on monitoring the performance of the virtual computing node while the virtual computing node executes the application and while the users interact with the application, determining, by the computing device, computing performance parameters of the virtual computing node while the virtual computing node executes the application and while the users interact with the application; based on (i) the computing performance parameters of the virtual computing node while the virtual computing node executes the application and while the users interact with the application and (ii) the virtual computing node being the first type of virtual computing node of the multiple different types of virtual computing nodes: determining, by the computing device, to execute the application on both the virtual computing node and an additional virtual computing node of the cloud computing system; and selecting, from among the multiple different types of virtual computing nodes, a second type of virtual computing node for the additional virtual computing node; and based on (i) determining to execute the application on both the virtual computing node and the additional virtual computing node and (ii) selecting the second type of virtual computing node for the additional virtual computing node, providing, by the computing device and to the cloud computing system, an instruction to execute the application on the virtual computing node and the additional virtual computing node.

These and other implementations can each optionally include one or more of the following features. The actions further include monitoring, by the computing device, performance of the virtual computing node and the additional virtual computing node while the virtual computing node and the additional computing node execute the application and while the users interact with the application; based on monitoring the performance of the virtual computing node and the additional virtual computing node while the virtual computing node and the additional computing node execute the application and while the users interact with the application, determining, by the computing device, additional computing performance parameters of the virtual computing node and the additional virtual computing node while the virtual computing node and the additional computing node execute the application and while the users interact with the application; based on (i) the additional computing performance parameters of the virtual computing node and the additional virtual computing node while the virtual computing node and the additional computing node execute the application and while the users interact with the application, (ii) the virtual computing node being the first type of virtual computing node of the multiple different types of virtual computing nodes, and (iii) the additional computing node being the second type of virtual computing node of the multiple different types of virtual computing nodes, determining, by the computing device, to cease execution of the application on the virtual computing node; and based on determining to cease execution of the application on the virtual computing node, providing, by the computing device and to the cloud computing system, an instruction to cease execution of the application.

The multiple types of virtual computing nodes include a general purpose virtual computing node, a processing power optimized virtual computing node, a memory optimized virtual computing node, a storage optimized virtual computing node, and a network capacity optimized virtual computing node. The computing performance parameters include processor load; memory usage; response time; graphical processor load; and storage utilization. The actions further include generating, by the computing device and using machine learning, a predictive model trained using multiple combinations of different types of virtual computing nodes executing one or more applications and measured computing performance parameters of the multiple combinations of virtual computing nodes while executing the one or more applications; applying, by the computing device and to the predictive model, a configuration of the virtual computing node being the first type of virtual computing node and the additional virtual computing node being the second type of virtual computing node executing the application. The actions of (i) determining to execute the application on both the virtual computing node and the additional virtual computing node and (ii) selecting the second type of virtual computing node for the additional virtual computing node are further based on applying, to the predictive model, the configuration of the virtual computing node being the first type of virtual computing node and the additional virtual computing node being the second type of virtual computing node executing the application.

The actions further include monitoring, by the computing device, performance of the virtual computing node and the additional virtual computing node while the virtual computing node and the additional computing node execute the application and while the users interact with the application; based on monitoring the performance of the virtual computing node and the additional virtual computing node while the virtual computing node and the additional computing node execute the application and while the users interact with the application, determining, by the computing device, additional computing performance parameters of the virtual computing node and the additional virtual computing node while the virtual computing node and the additional computing node execute the application and while the users interact with the application; based on (i) the additional computing performance parameters of the virtual computing node and the additional virtual computing node while the virtual computing node and the additional computing node execute the application and while the users interact with the application, (ii) the virtual computing node being the first type of virtual computing node of the multiple different types of virtual computing nodes, and (iii) the additional computing node being the second type of virtual computing node of the multiple different types of virtual computing nodes: determining, by the computing device, to replace the virtual computing node with another virtual computing node of the cloud computing system; and selecting, from among the multiple different types of virtual computing nodes, a third type of virtual computing node for the other virtual computing node; and based on (i) determining to replace the virtual computing node with the other virtual computing node and (ii) selecting the third type of virtual computing node for the other virtual computing node: providing, by the computing device and to the cloud computing system, an instruction to cease execution of the application; and providing, by the computing device and to the cloud computing system, an instruction to execute the application on the other virtual computing node.

The actions further include receiving, by the computing device and from a user, a request to execute the application on the cloud computing system, wherein the request includes a number of concurrent users of the application; applying, by the computing device, the request to execute the application on the cloud computing system to one or more templates that each define a different configuration of different types of virtual computing nodes of the cloud computing system; based on applying the request to the one or more templates, generating, by the computing device, a recommendation to execute the application on the first type of virtual computing node of the cloud computing system; and providing, for output by the computing device, the recommendation to execute the application on the first type of virtual computing node of the cloud computing system. The actions of (i) determining to execute the application on both the virtual computing node and the additional virtual computing node of the cloud computing system and (ii) selecting, from among the multiple different types of virtual computing nodes, a second type of virtual computing node for the additional virtual computing node are further based on a comparison between a number of the users interacting with the application and the number of concurrent users specified in the request to execute the application.

Other implementations of this aspect include corresponding systems, apparatus, and computer programs recorded on computer storage devices, each configured to perform the operations of the methods.

Particular implementations of the subject matter described in this specification can be implemented so as to realize one or more of the following advantages. A system may ensure that the virtual computing nodes that are executing an application are appropriate in size and number to provide users with the required performance of the application while optimizing usage of computing resources.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
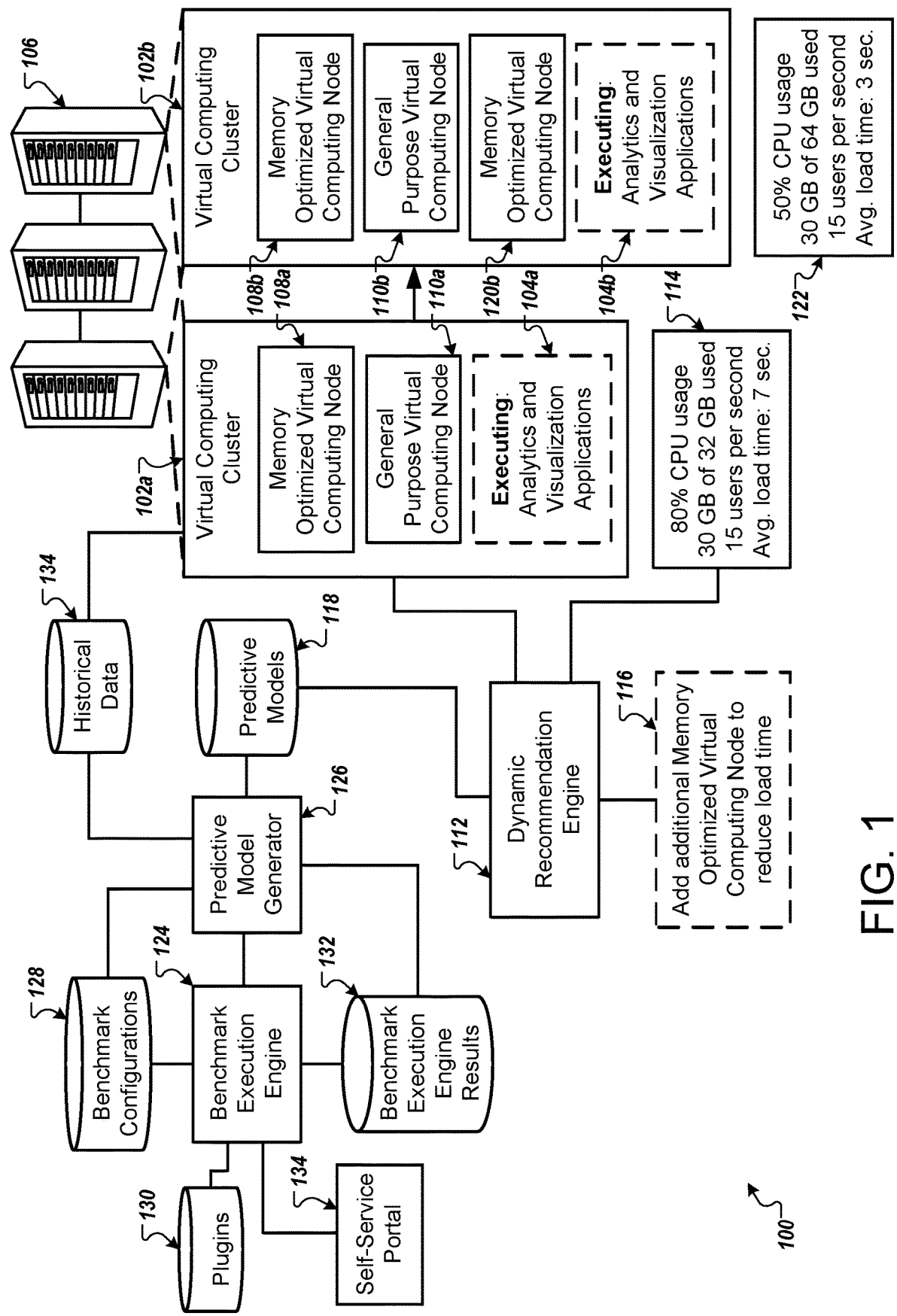
FIG. 1 is an example system for adjusting the nodes in a virtual computing cluster.

FIG. 1 is an example system 100 for adjusting the nodes in a virtual computing cluster. Briefly, and as described in more detail below, the system 100 monitors the performance of the virtual computing cluster 102a while the virtual computing cluster 102a is executing analytics and visualization applications 104a. The system 100 observes that the performance of the virtual computing cluster 102a is decreasing. In response to this observation, the system 100 identifies the particular type of virtual computing node to add to the virtual computing cluster 102*b* such that the performance of the virtual computing cluster 102*b* maintains the level of performance specified by a user.

In more detail, the system 100 includes a cloud computing service that includes a server bank 106, or cloud computing system. The cloud computing service provides users access to the computing resources of the server bank 106 by selling virtual computing nodes. The virtual computing nodes may have qualities that are similar to actual computers while the server bank 106 executes the processes requested by the user. The virtual computing nodes may include several different type of virtual computing nodes, such as, a general purpose virtual computing node, a virtual computing node optimized for processing power, a virtual computing node optimized for memory, a virtual computing node optimized for storage, a virtual computing node optimized for graphics, and similar types of virtual computing nodes. Each type of virtual computing node may have multiple models with varying levels of processing power, memory, storage, network bandwidth, and similar computer characteristics. Each virtual computing node may have an associated cost per unit of time, such as a cost per hour. The cost per hour of each virtual computing node may vary depending on the type and model of the virtual computing node.

A user may request that the server bank 106 provide the computing resources of the virtual computing cluster 102*a* to execute the analytics and visualization applications 104*a*. The user may specify that the virtual computing cluster 102*a* includes a memory optimized virtual computing node 108*a* and a general purpose virtual computing node 110*a*. Additional users may access the virtual computing cluster 102*a* while the virtual computing cluster 102*a* executes the analytics and visualization applications 104*a*. For example, one user may request to view a dashboard of data that relates to types of streaming movies watch by viewers in a Asia. Another user may request to view a dashboard of data that relates to new streaming customers in the United States and filter to see the data for each individual state.

During execution of the analytics and visualization applications 104*a*, the users interacting with the virtual computing cluster 102*a* and the processing done by the virtual computing cluster 102*a* consumes computing resources. The computing resources may be similar to those of non-virtual computers. For example, the resources may include CPU time, memory, storage, network bandwidth, and any other similar resource. The users may also experience different load times when interacting with the virtual computing cluster 102*a*. For example, if there are fifteen concurrent users, then each user may experience a loading time of seven seconds. If there are ten concurrent users, then each user may experience a loading time of five seconds.

The dynamic recommendation engine 112 monitors the performance of the virtual computing cluster 102*a* while the virtual computing cluster 102*a* executes the analytics and visualization applications 104*a*. For example, the dynamic recommendation engine 112 may observe the computing performance parameters 114 of the virtual computing cluster 102*a* while executing the analytics and visualization applications 104*a*. The computing performance parameters 114 may include that CPU running at eighty percent utilization, thirty gigabytes of the thirty-two gigabytes of memory are used, an average of fifteen users per second access the analytics and visualization applications 104*a* on the virtual computing cluster 102*a*, and an average load of the analytics and visualization applications 104*a* for each user is seven seconds.

The dynamic recommendation engine 112 may compare the computing performance parameters 114 to a set of performance goals set by a user. For example, the user may specify that each user should have a load time of less than five seconds when fifteen users are accessing the analytics and visualization applications 104*a* on the virtual computing cluster 102*a*. The dynamic recommendation engine 112 generates an scaling adjustment 116 to the virtual computing cluster 102*a* to ensure that the virtual computing cluster 102*a* maintains the specified load times for the particular number of users. In the example in FIG. 1, the dynamic recommendation engine 112 determines that the scaling adjustment 116 should be to add an additional memory optimized virtual computing node to the virtual computing cluster 102*a*.

The dynamic recommendation engine 112 applies the predictive models 118 to the current configuration of the virtual computing cluster 102*a*, characteristics of the analytics and visualization applications 104*a*, the computing performance parameters 114, and the user specified performance parameters to generate the scaling adjustment 116. The scaling adjustment 116 includes the specific type of virtual computing node to add to the virtual computing cluster 102*a*. For example, the dynamic recommendation engine 112 may determine that adding a general purpose virtual computing node to the virtual computing cluster 102*a* may not satisfy the user specified performance parameters. The dynamic recommendation engine 112 may go even farther to specify the particular model of virtual computing node to add to the virtual computing cluster 102*a*. For example, the dynamic recommendation engine 112 may specify to add a memory optimized virtual computing node with two CPU cores and thirty-two gigabytes of memory.

In some implementations, the dynamic recommendation engine 112 may also factor in the cost of the virtual computing nodes when generating the scaling adjustment 116. For example, the dynamic recommendation engine 112 may generate the scaling adjustment 116 of adding a memory optimized virtual computing node with two CPU cores and thirty-two gigabytes of memory. A general purpose computing node with four CPU cores and sixty-four gigabytes of memory may also satisfy the user specified performance parameters but may cost more than adding the memory optimized virtual computing node with two CPU cores and thirty-two gigabytes of memory. Because of the lower cost the scaling adjustment 116 is to add a memory optimized virtual computing node with two CPU cores and thirty-two gigabytes of memory.

In some implementations, the dynamic recommendation engine 112 may generate a scaling adjustment 116 that removes a virtual computing node from the virtual computing cluster 102*a*. For example, the dynamic recommendation engine 112 may determine that the CPU is running at thirty percent utilization, ten gigabytes of thirty-two gigabytes of memory are used, ten users per second are accessing the analytics and visualization applications 104*a*, and the average load time for each user is two seconds. In this instance, the dynamic recommendation engine 112 may apply the predictive models 118 and generate the scaling adjustment 116 to remove a virtual computing node from the virtual computing cluster 102*a*. The scaling adjustment 116 may be to remove the general purpose computing node 110*a* from the virtual computing cluster 102*a*. The dynamic recommendation engine 112 may determine that the virtual computing cluster 102a can meet the user specified performance parameters without the general purpose computing node 118a. To save on costs, the scaling adjustment 116 may be to remove a virtual computing node. If the computing performance parameters 114 drop below the user specified preface parameters, then the scaling adjustment 116 may be to add a specific type and model of virtual computing node.

In some implementations, the dynamic recommendation engine 112 may generate a scaling adjustment 116 that replaces a virtual computing node of the virtual computing cluster 102a. For example, the dynamic recommendation engine 112 may determine that the CPU is running at fifty percent utilization, sixteen gigabytes of thirty-two gigabytes of memory are used, twelve users per second are accessing the analytics and visualization applications 104a, and the average load time for each user is four seconds. In this instance, the dynamic recommendation engine 112 may apply the predictive models 118 and generate the scaling adjustment 116 to replace a virtual computing node from the virtual computing cluster 102a. The scaling adjustment 116 may be to replace the memory optimized virtual computing node 108a from the virtual computing cluster 102a with a general purpose virtual computing node. The dynamic recommendation engine 112 may determine that the virtual computing cluster 102a can meet the user specified performance parameters with a cheaper general purpose virtual computing node instead of the more expensive memory optimized virtual computing node 108a. If the computing performance parameters 114 drop below the user specified preface parameters, then the scaling adjustment 116 may be to replace or add a specific type and model of virtual computing node.

The server bank 106 implements the scaling adjustment 116 of the dynamic recommendation engine 112. For example, the server bank 106 adds the memory optimized virtual computing node 120b to the virtual computing cluster 102a which is illustrated in FIG. 1 as the virtual computing cluster 102b. The virtual computing cluster 102a computing cluster executes the analytics and visualization applications 104a while the server bank 106 adds the memory optimized virtual computing node 120b. The virtual computing cluster 102b continues to execute the analytics and visualization applications 104b after adding the memory optimized virtual computing node 120b.

The dynamic recommendation engine 112 continues to monitor the performance of the virtual computing cluster 102b. The dynamic recommendation engine 112 may add, remove, or replace any of the virtual computing nodes of the virtual computing cluster 102b with different virtual computing node types or models to maintain the user specified performance parameters at the lowest cost. In the example shown in FIG. 1, the dynamic recommendation engine 112 measures the computing performance parameters 122 that describe the CPU running at fifty percent utilization, thirty gigabytes of memory out of sixty four gigabytes of memory is used, an average of fifteen users are accessing the analytics and visualization applications 104b each second, and each user experiences an average load time of three seconds.

The system includes a benchmark execution engine 124 and a predictive model generator 126 to generate the predictive models 118 used by the dynamic recommendation engine. The benchmark execution engine 124 is configured to execute the benchmark configurations 128 to provide the current system behavior. Each benchmark configuration specifies a set of plugins for the benchmark execution engine 124 to load and a number of concurrent users accessing the simulated configuration. The plugin architecture of the benchmark execution engine 124 will be explained below. An example of a benchmark configuration may specify a plugin for a visualization application and ten concurrent users accessing the virtualization application. Another example of a benchmark configuration may specify a plugin for an analytics application and twenty concurrent users accessing the analytics application. The benchmark configuration may also specify a plugin for queries that the users may submit to the analytics application. The benchmark configurations 128 may not include every different possible configuration for virtual computing clusters on the server bank 106. As noted above, the benchmark execution engine 124 employs a plugin architecture to adapt its configuration for execution of each benchmark configuration. The plugins 130 may include plugins for several different components that the server bank 106 may execute. For example, the plugins 130 may include an analytics application plugin, an online analytics processing application, a visualization application plugin, a machine learning plugin, a group of custom queries, or any other similar type of component that the server bank 106 may execute.

The benchmark execution engine 124 accesses a benchmark from the benchmark configurations 128. The benchmark execution engine 124 identifies the plugins that match the benchmark. For example, the benchmark may be twenty concurrent users accessing an analytics application. The benchmark execution engine 124 may access the analytics application plugin. In some implementations, a benchmark configuration may correspond to more than one component. In this instance, the benchmark execution engine 124 may load multiple plugins to run the benchmark.

The benchmark execution engine 124 executes the benchmark with the appropriate plugin. If the test is successful, then the benchmark execution engine 124 will access and store the logs generated during the test and analyze the metrics (e.g., node metrics, utilization of the system, overall end to end processing, etc.). If the test is not successful, then the benchmark execution engine 124 will analyze the problem and determine why the unsuccessful test occurred. The benchmark execution engine 124 stores the test results in the benchmark execution engine results 132.

The benchmark execution engine 124 may execute each benchmark multiple times. For example, the benchmark execution engine 124 may execute the benchmark configuration of twenty concurrent users accessing an analytics application multiple times. Each time the benchmark execution engine 124 executes a benchmark, the benchmark execution engine 124 accesses and stores the logs generated during the test and analyzes the metrics. The benchmark execution engine 124 may compute standard deviations for each metric. If the standard deviations are each within a predetermined threshold, then the benchmark execution engine 124 marks the tests results stored in the benchmark execution engine results 132 as an accurate representation of the computing load represented by the benchmark.

The predictive model generator 126 may use the benchmark configurations 128 and the benchmark execution engine results 132 as training data for a machine learning process to generate the predictive models. In some implementations, the predictive model generator 126 may only use the results stored in the benchmark execution engine results 132 labeled as an accurate representations of the computing load represented by the benchmark configuration. The dynamic recommendation engine may use the predictive models 118 to predict how the virtual computing cluster 102a will behave if virtual computing nodes are added, removed, or replaced. Even though there may not be a benchmark configuration for each possible virtual computing cluster configuration, the predictive model generator 126 and dynamic recommendation engine 112 are configured to predict the behavior of the any configuration of the virtual computing cluster 102a with the addition, removal, or replacement of any type and/or model of virtual computing nodes.

In some implementations, the system 100 employs a feedback mechanism to continuously update and retrain the predictive models 118. For example, the system 100 may store, in the historical data 134, configuration details for the virtual computing cluster 102a and the related performance parameters 114 for the virtual computing cluster 102a while executing the analytics and visualization applications 104a. The system 100 may also store, in the historical data 134, configuration details for the virtual computing cluster 102b and the related performance parameters 122 for the virtual computing cluster 102b while executing the analytics and visualization applications 104b. The configuration details may include the type and model of the virtual computing nodes executing the applications. The predictive model generator 126 may access the historical data 134 and update the predictive models 118 using machine learning techniques. The dynamic recommendation engine 112 may access the updated predictive models 118 to generate recommendations to add, remove, or replace virtual computing nodes in the virtual computing cluster.

In some implementations, the system 100 includes a self-service portal 134 that a user may access to provide benchmark configurations to the benchmark execution engine 124. The benchmark configurations 128 may include multiple different configurations for the benchmark execution engine 124 to execute. In some instances, a user may wish to execute some benchmark configurations that are not included in the benchmark configurations 128. The user may provide a benchmark configuration such as a data visualization application with one hundred concurrent users. The benchmark execution engine 124 may load the plugin for the data visualization application and simulate one hundred users accessing the data visualization application. The benchmark execution engine 124 may return the statics and results of the execution including node metrics, utilization of the system, overall end to end processing, etc. The user may provide additional benchmark configurations to the benchmark execution engine 124 for testing. In some implementations, the benchmark execution engine 124 may store the statics and results of the execution of the benchmark configurations provided through the self-service portal 134 in the benchmark execution engine results 132. In some implementations, the benchmark execution engine 124 may not store the statics and results of the execution of the benchmark configurations provided through the self-service portal 134 in the benchmark execution engine results 132. In some implementations, the user may indicate whether to store the results in the benchmark execution engine results 132.

Figure 2:
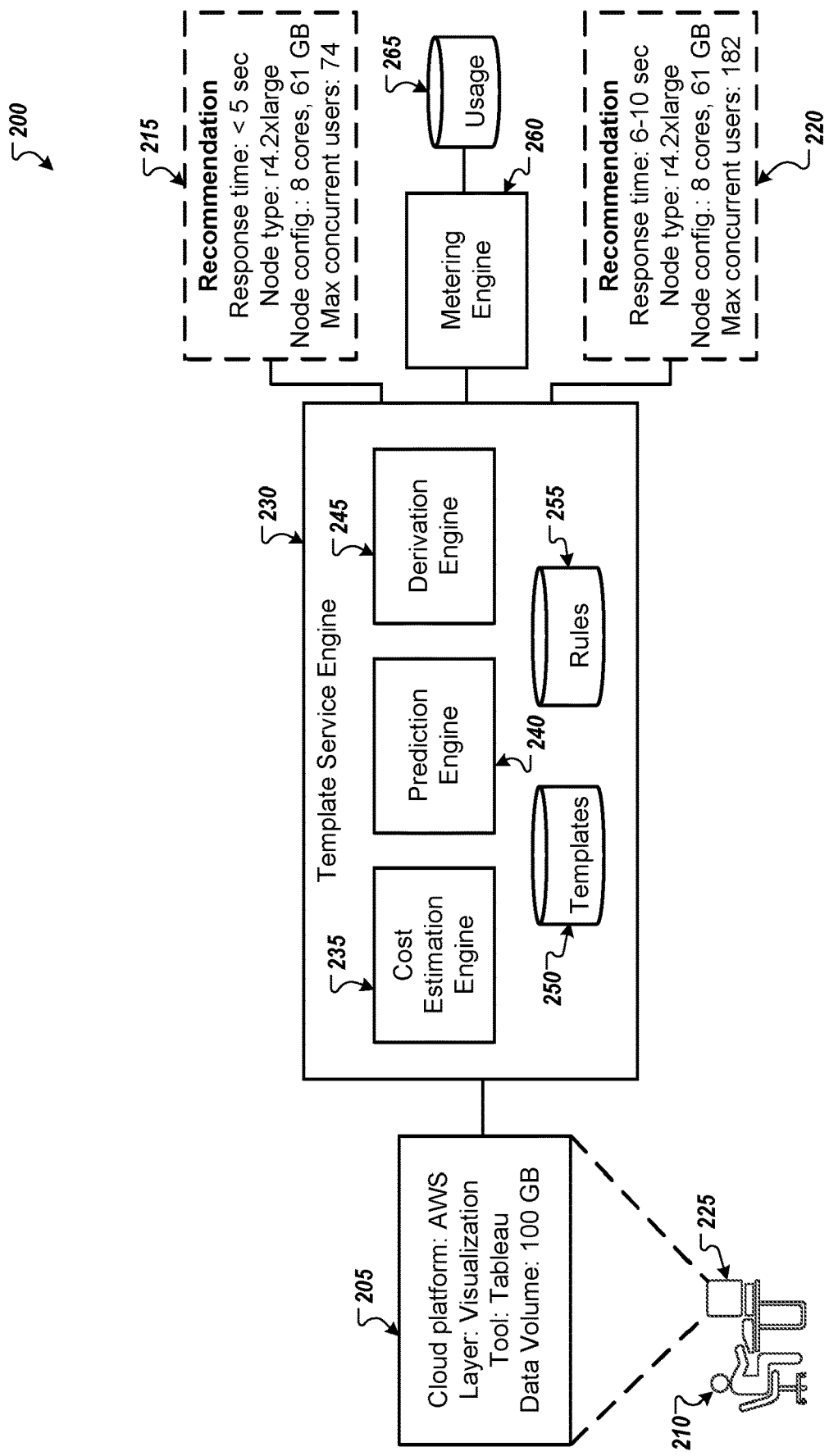
FIG. 2 is an example system for providing a configuration recommendation given a usage requirement.

FIG. 2 is an example system 200 for providing a configuration recommendation given a usage requirement. Briefly, and as described in more detail below, the system 200 receives a usage scenario 205 from a user 210. The usage scenario 205 specifies the software and usage parameters for a software configuration requirement. The system 200 processes the usage scenario 205 and provides one or more recommendations 215 and 220. The recommendations 215 and 220 may include a recommended configuration for a virtual computing cluster to run the usage scenario 205.

In more detail, the user 210 submits, though a computing device 225, a usage scenario 205. The usage scenario 205 may specify the software and usage parameters for a software configuration requirement. For example, the usage scenario 205 may specify that the cloud platform is AWS, the layer is visualization, the tool is Tableau, and the data volume is one hundred gigabytes. The usage scenario 205 may include additional fields such as scenario (e.g., view reports), feature (e.g., live), data source (e.g., redshift), complexity (e.g., medium), concurrency (e.g., ten users), and data encryption (e.g., yes or no).

The template service engine 230 receives the usage scenario 205. The template service engine applies the usage scenario 205 to a cost estimation engine 235, a prediction engine 240, and a derivation engine 245 to generate one or more recommendations 215 and 220. A recommendation may include specific node types and configurations and system response times for a specified number of concurrent users. For example, recommendation 215 provides a response time of less than five seconds and specifies a node type of r4.2xlarge and a node configurations of eight cores and sixty-one gigabytes for a maximum of seventy-four concurrent users. Recommendation 220 provides a response time of between six and ten seconds and specifies a node type of r4.2xlarge and a node configurations of eight cores and sixty-one gigabytes for a maximum of one hundred eighty-two concurrent users. Other recommendations may specify additional server and worker node types, operating system types, number of servers node, and number of worker nodes.

The cost estimation engine 235 factors in the cost of each node included in the recommendations 215 and 220. The cost estimation engine 235 may select nodes that can satisfy the usage scenario 205 at a lowest cost. For example, the cost estimation engine 235 may select nodes with fewer cores and less memory if the nodes with fewer cores and less memory can still satisfy the usage scenario 205.

The prediction engine 240 may access the templates 250. The templates may include various configurations that may be the basis for the recommendations 215 and 220. A template may be a sample configuration that the prediction engine 240 can apply to the usage scenario 205 to determine whether the template will satisfy the usage scenario 205.

The prediction engine 240 may coordinate with the derivation engine 245 to determine whether the template will satisfy the usage scenario 205. The derivation engine 245 may access the rules 255 to determine how the usage scenario 205 may function with each template. In some instances, the templates 250 may not include the specific template to apply to the usage scenario 205. In this instance, the derivation engine may apply the rules to extrapolate the templates 250 to determine a template that fits the usage scenario 205 while satisfying the cost estimation engine 235. For example, the usage scenario 205 may specify that the cloud platform is AWS, the layer is visualization, the tool is Tableau, and the data volume is one hundred gigabytes. The templates 250 may not include this combination. Instead, the templates correspond to a scenario where the cloud platform is AWS, the layer is visualization, the tool is Tableau, and the data volume is fifty gigabytes. The derivation engine 245 may apply the rules 255 to determine how the templates 250 may operate under the usage scenario 205. Based on the coordination of the estimation engine 240, the prediction engine 240, and the derivation engine 245, the template service engine generates the one or more recommendations 215 and 220.

In some implementations, the system 200 includes a metering engine 260. The metering engine 260 may be configured to monitor the usage of the system 200 by the user 210 and other users. The metering engine 260 may store usage information of the user 210 and other users in the usage storage 265. The template service engine 230 may access the usage 265 to determine a cost of providing the recommendations 215 and 220 to the user 210. The template service engine 230 may provide the user 210 a discount to provide the recommendations 215 and 220 if the user 210 is a frequent user of the template service engine 230. Similarly, the template service engine 230 may not provide a discount to provide the recommendations 215 and 220 if the user 210 is not a frequent user of the template service engine 230. The template service engine 230 may use a tiered system to determine the costs of providing the recommendations 215 and 220. For example, if the user has accessed the template service engine 230 seven times, then the template service engine 230 may apply a discount for users who have accessed the template service engine 230 between five and ten times.

In some implementations, the system 100 may include a metering engine similar to metering engine 260. The metering engine of system 100 may store the usage of various users for how often the system 100 provides an scaling adjustment 116, how often the user accesses the self-service portal 134 to test a user-provided benchmark configuration, how often the system 100 accesses benchmark execution engine results 134 based on a user-provided benchmark configuration, how often the system 100 accesses benchmark execution engine results 134 based on a system-provided benchmark configuration, and other similar usage parameters. The system 100 may generate a cost for the user to access the system 100 and may provide the user a discount if the user frequently accesses the system 100 or the system 100 frequently provides a scaling adjustment 116 for the user. The system 100 may use a tiered system to determine the costs similar to system 200.

In some implementations, a user may access the system 200 of FIG. 2 before deploying the user's application to a server bank that includes multiple virtual computing nodes. The system 200 may provide the user with a recommended configuration of types and models of virtual computing nodes for the user's application. The user may deploy the application to the recommended types and models of virtual computing nodes. While the virtual computing nodes are executing the application, the user may request that the system 100 of FIG. 1 monitor the performance of the virtual computing nodes. System 100 may add, remove, or replace a virtual computing node executing the application to ensure that the computing resources of the virtual computing nodes are optimally used by the application.

Figure 3:
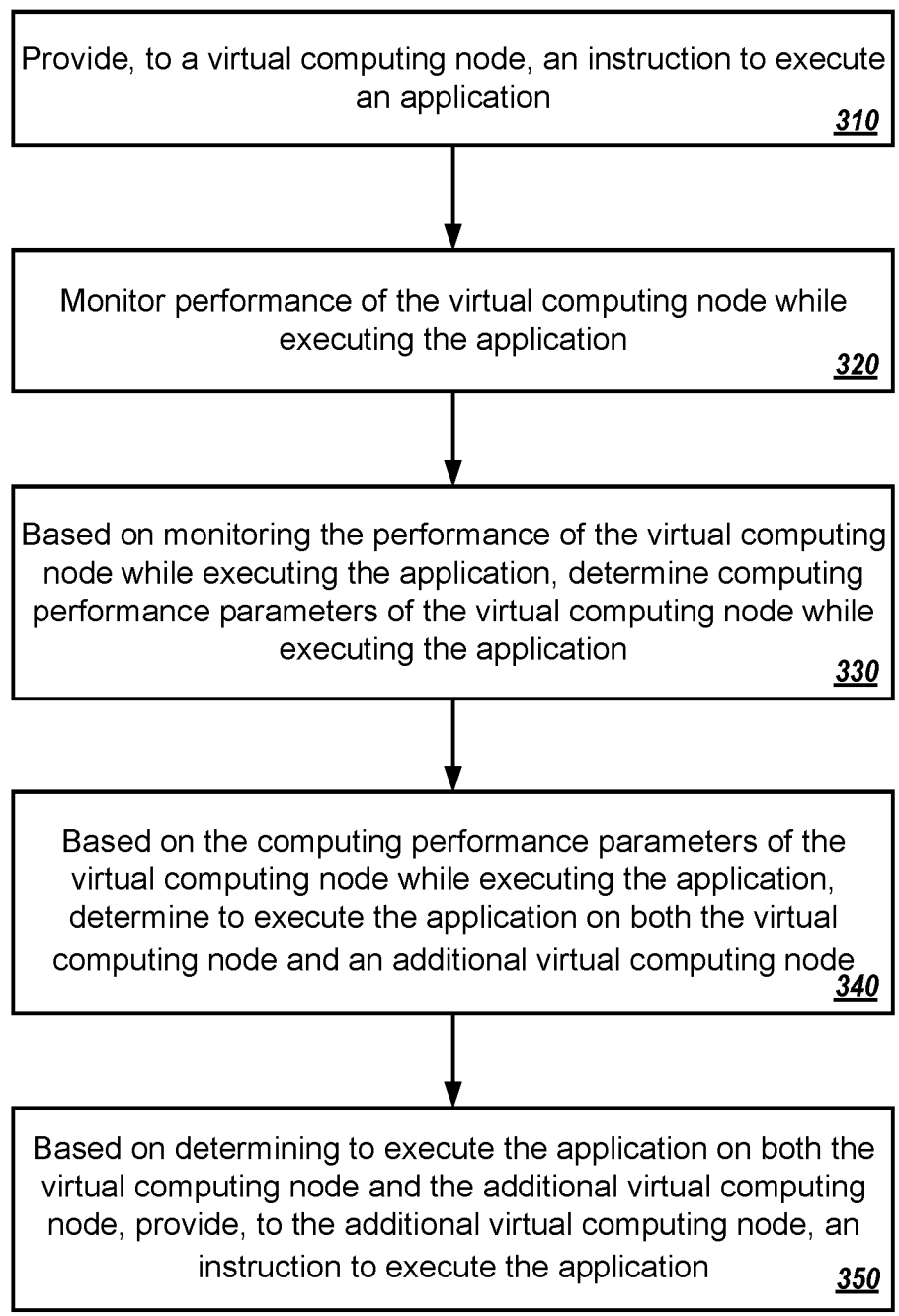
FIG. 3 is a flowchart of an example process for adjusting the nodes in a virtual computing cluster.

FIG. 3 is a flowchart of an example process 300 for adjusting the nodes in a virtual computing cluster. In general, the process 300 monitors the performance of a virtual computing node while the virtual computing node is executing an application. The process 300 determines to add an additional virtual computing node to execute the application based on analyzing computing performance parameters of the virtual computing node. The process 300 will be described as being performed by a computer system comprising one or more computers, for example, the system 100 of FIG. 1 or the system 200 of FIG. 2.

The system provides, to a virtual computing node, an instruction to execute an application (310). The virtual computing node may be running on a server bank. As an example, the system may instruct the virtual computing node to execute an analytics application. Several different users may concurrently interact with the analytics application.

The system monitors performance of the virtual computing node while executing the application (320). The system determines computing performance parameters of the virtual computing node while executing the application based on monitoring the performance of the virtual computing node while executing the application (330). In some implementations, the computing performance parameters include processor load, memory usage, response time, graphical processor load, and storage utilization. As an example, the computing performance parameters of the virtual computing node may be that the CPU is at fifty percent utilization and twelve gigabytes of sixteen gigabytes of memory is used. An average of three users may access the analytics application each second and each has an average response time of eight seconds.

The system determines to execute the application on both the virtual computing node and an additional virtual computing node based on the computing performance parameters of the virtual computing node while executing the application (340). In some implementations, the virtual computing node and the additional virtual computing node are a type of virtual computing node. The types of virtual computing nodes may include a general purpose virtual computing node, a processing power optimized virtual computing node, a memory optimized virtual computing node, a storage optimized virtual computing node, and a network capacity optimized virtual computing node. Each type of virtual computing node many have different models. In some implementations, the system determines a specific type and model for the additional virtual computing node based on the computing performance parameters of the virtual computing node while executing the application.

In some implementations, the system uses machine learning to determine whether to add an additional virtual computing node. The system trains a predictive model using multiple combinations of virtual computing nodes executing one or more applications and measured computing performance parameters of the multiple combinations of virtual computing nodes while executing the one or more applications. In some implementations, the system uses the cost of each type and model of virtual computing node to train the predictive model. The system applies the multiple configurations of various virtual computing nodes to the model to determine which configuration is likely to give the best performance at the lowest cost. The system may train the predictive model using combinations of different virtual computing node types and virtual computing node models. In this instance, the system may use the predictive model to identify the particular type and model configurations that are likely to give the best performance at the lowest cost.

The system provides, to the additional virtual computing node, an instruction to execute the application based on determining to execute the application on both the virtual computing node and the additional virtual computing node (350). In some implementations, the system may replace the virtual computing node with the additional computing node. In some implementations, the system may reduce the number of virtual computing nodes executing the application. For example, if the virtual computing node and the additional computing node are executing the application, then the system may reduce instruct the virtual computing node to cease execution of the application while the additional computing node continues execution of the application.

In some implementations, the virtual computing node and the additional virtual computing node may be the same type and model of virtual computing node. In some implementations, the virtual computing node and the additional virtual computing node are the same type and different models of virtual computing nodes. In some implementations, the virtual computing node and the additional virtual computing node are different types of virtual computing nodes.

In some implementations, the system may factor the type and model of virtual computing node for the virtual computing node when selecting the type and model of the additional computing node. For example, if the computing performance parameters indicate that memory and processing power are both near being maxed out and the virtual computing node is a memory optimized virtual computing node, then the system may select a processing power optimized virtual computing node for the additional computing node.

In some implementations, the system may use the number of concurrent users accessing the application to select a type for the additional virtual computing node. The system may compare the number of concurrent users accessing the application to the number of concurrent users that the system may have been initially configured for. For example, a user may have provided the system with a requirement to run a data analysis application with a load time of between six and ten seconds for ten concurrent users. The system may compare the present or average number of concurrent users to the number of concurrent users from the request to select the type of additional virtual computing node. For example, the system may select a network capacity optimized virtual computing node if the present or average number of concurrent users is twenty and the number of concurrent users from the request is ten.

Figure 4:
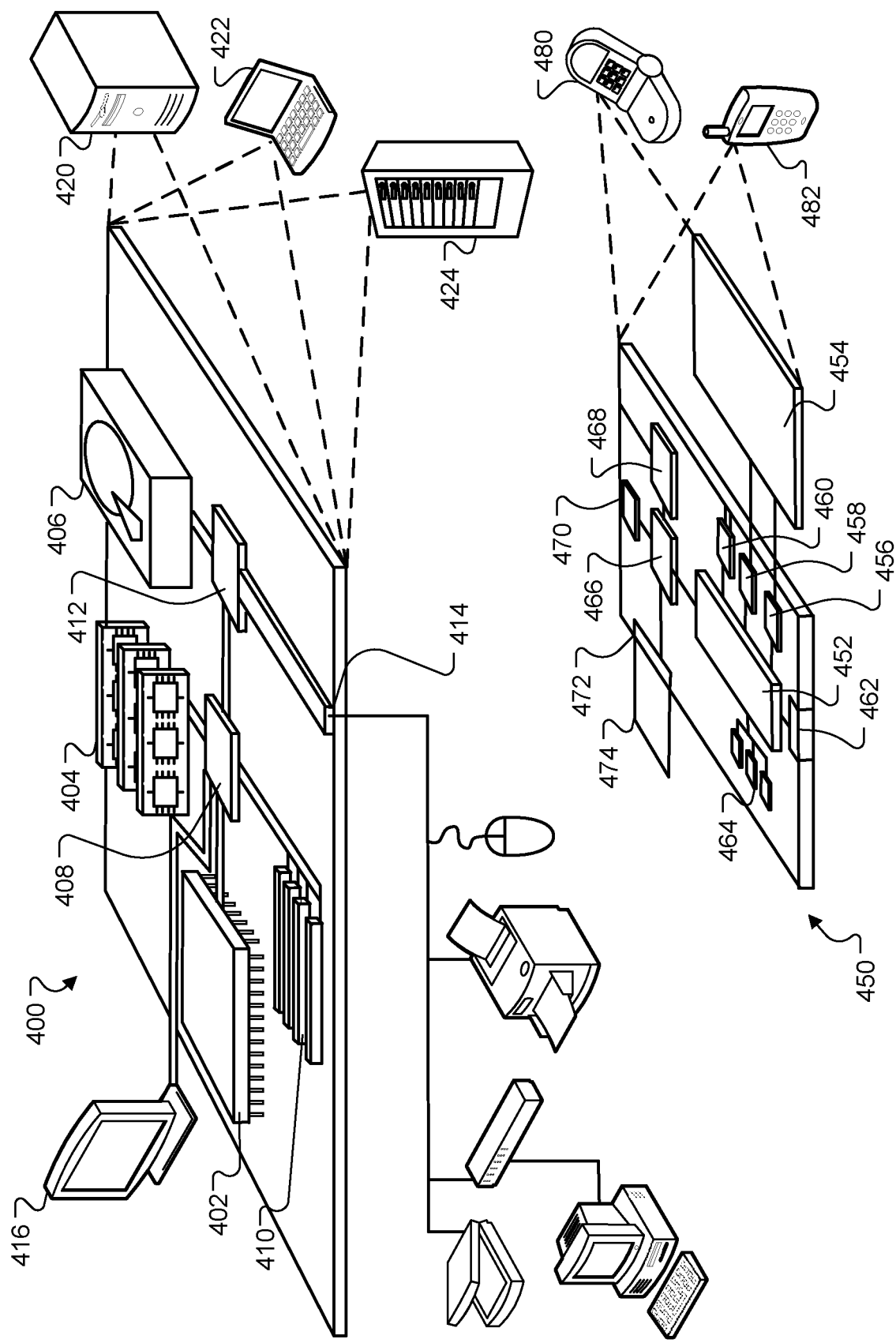
FIG. 4 is an example of a computing device and a mobile computing device.

FIG. 4 shows an example of a computing device 400 and a mobile computing device 450 that can be used to implement the techniques described here. The computing device 400 is intended to represent various forms of digital computers, such as laptops, desktops, workstations, personal digital assistants, servers, blade servers, mainframes, and other appropriate computers. The mobile computing device 450 is intended to represent various forms of mobile devices, such as personal digital assistants, cellular telephones, smart-phones, wireless (e.g., Bluetooth) headsets, hearing aid, smart watches, smart glasses, activity trackers, and other similar computing devices. The components shown here, their connections and relationships, and their functions, are meant to be examples only, and are not meant to be limiting.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as a display 416 coupled to the high-speed interface 408. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of computer-readable medium, such as a magnetic or optical disk.

The storage device 406 is capable of providing mass storage for the computing device 400. In some implementations, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 402), perform one or more methods, such as those described above. The instructions can also be stored by one or more storage devices such as computer- or machine-readable mediums (for example, the memory 404, the storage device 406, or memory on the processor 402).

The high-speed interface 408 manages bandwidth-intensive operations for the computing device 400, while the low-speed interface 412 manages lower bandwidth-intensive operations. Such allocation of functions is an example only. In some implementations, the high-speed interface 408 is coupled to the memory 404, the display 416 (e.g., through a graphics processor or accelerator), and to the high-speed expansion ports 410, which may accept various expansion cards (not shown). In the implementation, the low-speed interface 412 is coupled to the storage device 406 and the low-speed expansion port 414. The low-speed expansion port 414, which may include various communication ports (e.g., USB, Bluetooth, Ethernet, wireless Ethernet) may be coupled to one or more input/output devices, such as a keyboard, a pointing device, a scanner, a microphone, speakers, or a networking device such as a switch or router, e.g., through a network adapter.

The computing device 400 may be implemented in a number of different forms, as shown in the figure. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device (not shown), such as a mobile computing device 450. Each of such devices may contain one or more of the computing device 400 and the mobile computing device 450, and an entire system may be made up of multiple computing devices communicating with each other.

The mobile computing device 450 includes a processor 452, a memory 464, an input/output device such as a touch-enabled display 454, a communication interface 466, and a transceiver 468, among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate.

The processor 452 can execute instructions within the mobile computing device 450, including instructions stored in the memory 464. The processor 452 may be implemented as a chipset of chips that include separate and multiple analog and digital processors. The processor 452 may provide, for example, for coordination of the other components of the mobile computing device 450, such as control of user interfaces, applications run by the mobile computing device 450, and wireless communication by the mobile computing device 450.

The processor 452 may communicate with a user through a control interface 458 and a display interface 456 coupled to the display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a SIMM (Single In Line Memory Module) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provided as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. The instructions, when executed by one or more processing devices (for example, processor 452), perform one or more methods, such as those described above. The instructions can also be stored by one or more storage devices, such as one or more computer- or machine-readable mediums (for example, the memory 464, the expansion memory 474, or memory on the processor 452). In some implementations, the instructions can be received in a propagated signal, for example, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 468 using a radio-frequency. In addition, short-range communication may occur, such as using a Bluetooth, WiFi, or other such transceiver (not shown). In addition, a GPS (Global Positioning System) receiver module 470 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in the figure. For example, it may be implemented as a cellular telephone 480. It may also be implemented as part of a smart-phone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method comprising:
providing, by a computing device, an instruction to execute an application in a cloud computing system set to a first configuration comprising a first set of virtual computing nodes, a virtual computing node of the first set of virtual computing nodes being of a first type;
monitoring, by the computing device, performance of the cloud computing system during execution of the application by the cloud computing system in the first configuration and while one or more users interact with the application;
based on monitoring the performance of the cloud computing system in the first configuration, determining, by the computing device, computing performance parameters of the cloud computing system representative of execution of the application by the cloud computing system in the first configuration;
based on (i) the computing performance parameters and (ii) the first configuration:
determining, by the computing device, to execute the application within the cloud computing system set to a second configuration comprising a second set of virtual computing nodes, and
selecting, from among multiple types of virtual computing nodes, a second type of virtual computing node to include in the second set of virtual computing nodes, such that the second set of virtual computing nodes is different from the first set of virtual computing nodes; and
providing, by the computing device and to the cloud computing system, an instruction to execute the application by the cloud computing system in the second configuration.

2. The method of claim 1, comprising:
monitoring, by the computing device, performance of the first type of virtual computing node and the second type of virtual computing node during execution of the application and while the one or more users interact with the application;
based on monitoring the performance of the first type of virtual computing node and the second type of virtual computing node, determining, by the computing device, additional computing performance parameters of the cloud computing system representative of execution of the application by the cloud computing system in the second configuration;
based on (i) the additional computing performance parameters, (ii) the first type of virtual computing node, and (iii) the second type of virtual computing, determining, by the computing device, to cease execution of the application by the cloud computing system in the second configuration; and
providing, by the computing device and to the cloud computing system, an instruction to cease execution of the application.

3. The method of claim 1, wherein the multiple types of virtual computing nodes comprise:
a general purpose virtual computing node,
a processing power optimized virtual computing node,
a memory optimized virtual computing node,
a storage optimized virtual computing node, and
a network capacity optimized virtual computing node.

4. The method of claim 1, wherein the computing performance parameters comprise:
processor load;
memory usage;
response time;
graphical processor load; and
storage utilization.

5. The method of claim 1, comprising:
generating, by the computing device and using machine learning, a predictive model trained using multiple combinations of different types of virtual computing nodes executing one or more applications and measured computing performance parameters of the multiple combinations of virtual computing nodes while executing the one or more applications; and
applying, by the computing device and to the predictive model, the second configuration within the cloud computing system.

6. The method of claim 1, comprising:
monitoring, by the computing device, performance of the first type of virtual computing node and the second type of virtual computing node during execution of the application and while the one or more users interact with the application;
based on monitoring the performance, determining, by the computing device, additional computing performance parameters of the cloud computing system representative of execution of the application by the cloud computing system in the second configuration;
based on (i) the additional computing performance parameters, (ii) the first type of virtual computing node of the multiple types of virtual computing nodes, and (iii) the second type of virtual computing node of the multiple types of virtual computing nodes:
determining, by the computing device, to replace the first type of virtual computing node with another type of virtual computing node, and selecting, from among the multiple types of virtual computing nodes, a third type of virtual computing node; and providing, by the computing device and to the cloud computing system, an instruction to execute the application in the cloud computing system set to a third configuration comprising the third type of virtual computing node.

7. The method of claim 1, comprising:

receiving, by the computing device and from a user, a request to execute the application on the cloud computing system, wherein the request includes a number of concurrent users of the application;

applying, by the computing device, the request to execute the application on the cloud computing system to one or more templates that each define a different configuration of different types of virtual computing nodes of the cloud computing system;

based on applying the request to the one or more templates, generating, by the computing device, a recommendation to execute the application on the first type of virtual computing node of the cloud computing system; and providing, for output by the computing device, the recommendation to execute the application on the first type of virtual computing node of the cloud computing system.

8. The method of claim 7, wherein (i) determining, by the computing device, to execute the application within the cloud computing system set to a second configuration comprising a second set of virtual computing nodes, and (ii) selecting, from among multiple types of virtual computing nodes, a second type of virtual computing node to include in the second set of virtual computing nodes are further based on a comparison between a number of the users interacting with the application and the number of concurrent users specified in the request to execute the application.

9. A system comprising:

one or more computers; and one or more storage devices storing instructions that are operable, when executed by the one or more computers, to cause the one or more computers to perform operations comprising:

providing, by a computing device, an instruction to execute an application in a cloud computing system set to a first configuration comprising a first set of virtual computing nodes, a virtual computing node of the first set of virtual computing nodes being of a first type;

monitoring, by the computing device, performance of the cloud computing system during execution of the application by the cloud computing system in the first configuration and while one or more users interact with the application;

based on monitoring the performance of the cloud computing system in the first configuration, determining, by the computing device, computing performance parameters of the cloud computing system representative of execution of the application by the cloud computing system in the first configuration;

based on (i) the computing performance parameters and (ii) the first configuration:

determining, by the computing device, to execute the application within the cloud computing system set to a second configuration comprising a second set of virtual computing nodes, and selecting, from among multiple types of virtual computing nodes, a second type of virtual computing node to include in the second set of virtual computing nodes, such that the second set of virtual computing nodes is different from the first set of virtual computing nodes; and providing, by the computing device and to the cloud computing system, an instruction to execute the application by the cloud computing system in the second configuration.

10. The system of claim 9, wherein operations further comprise:

monitoring, by the computing device, performance of the first type of virtual computing node and the second type of virtual computing node during execution of the application and while the one or more users interact with the application;

based on monitoring the performance of the first type of virtual computing node and the second type of virtual computing node, determining, by the computing device, additional computing performance parameters of the cloud computing system representative of execution of the application by the cloud computing system in the second configuration;

based on (i) the additional computing performance parameters, (ii) the first type of virtual computing node, and (iii) the second type of virtual computing, determining, by the computing device, to cease execution of the application by the cloud computing system in the second configuration; and providing, by the computing device and to the cloud computing system, an instruction to cease execution of the application.

11. The system of claim 9, wherein the multiple types of virtual computing nodes comprise:

a general purpose virtual computing node,
a processing power optimized virtual computing node,
a memory optimized virtual computing node,
a storage optimized virtual computing node, and
a network capacity optimized virtual computing node.

12. The system of claim 9, wherein the computing performance parameters comprise:

processor load;
memory usage;
response time;
graphical processor load; and
storage utilization.

13. The system of claim 9, wherein operations further comprise:

generating, by the computing device and using machine learning, a predictive model trained using multiple combinations of different types of virtual computing nodes executing one or more applications and measured computing performance parameters of the multiple combinations of virtual computing nodes while executing the one or more applications; and applying, by the computing device and to the predictive model, the second configuration within the cloud computing system.

14. The system of claim 9, wherein operations further comprise:

monitoring, by the computing device, performance of the first type of virtual computing node and the second type of virtual computing node during execution of the application and while the one or more users interact with the application;

based on monitoring the performance, determining, by the computing device, additional computing performance parameters of the cloud computing system representative of execution of the application by the cloud computing system in the second configuration;

based on (i) the additional computing performance parameters, (ii) the first type of virtual computing node of the multiple types of virtual computing nodes, and (iii) the second type of virtual computing node of the multiple types of virtual computing nodes:
  determining, by the computing device, to replace the first type of virtual computing node with another type of virtual computing node, and
  selecting, from among the multiple types of virtual computing nodes, a third type of virtual computing node; and providing, by the computing device and to the cloud computing system, an instruction to execute the application in the cloud computing system set to a third configuration comprising the third type of virtual computing node.

15. The system of claim 9, wherein operations further comprise:
  receiving, by the computing device and from a user, a request to execute the application on the cloud computing system, wherein the request includes a number of concurrent users of the application;
  applying, by the computing device, the request to execute the application on the cloud computing system to one or more templates that each define a different configuration of different types of virtual computing nodes of the cloud computing system;
  based on applying the request to the one or more templates, generating, by the computing device, a recommendation to execute the application on the first type of virtual computing node of the cloud computing system; and
  providing, for output by the computing device, the recommendation to execute the application on the first type of virtual computing node of the cloud computing system.

16. The system of claim 15, wherein (i) determining, by the computing device, to execute the application within the cloud computing system set to a second configuration comprising a second set of virtual computing nodes, and (ii) selecting, from among multiple types of virtual computing nodes, a second type of virtual computing node to include in the second set of virtual computing nodes are further based on a comparison between a number of the users interacting with the application and the number of concurrent users specified in the request to execute the application.

17. A non-transitory computer-readable medium storing software comprising instructions executable by one or more computers which, upon such execution, cause the one or more computers to perform operations comprising:
  providing, by a computing device, an instruction to execute an application in a cloud computing system set to a first configuration comprising a first set of virtual computing nodes, a virtual computing node of the first set of virtual computing nodes being of a first type;
  monitoring, by the computing device, performance of the cloud computing system during execution of the application by the cloud computing system in the first configuration and while one or more users interact with the application;
  based on monitoring the performance of the cloud computing system in the first configuration, determining, by the computing device, computing performance parameters of the cloud computing system representative of execution of the application by the cloud computing system in the first configuration;
  based on (i) the computing performance parameters and (ii) the first configuration:
    determining, by the computing device, to execute the application within the cloud computing system set to a second configuration comprising a second set of virtual computing nodes, and
    selecting, from among multiple types of virtual computing nodes, a second type of virtual computing node to include in the second set of virtual computing nodes, such that the second set of virtual computing nodes is different from the first set of virtual computing nodes; and
  providing, by the computing device and to the cloud computing system, an instruction to execute the application by the cloud computing system in the second configuration.

18. The non-transitory computer-readable medium of claim 17, wherein operations further comprise:
  monitoring, by the computing device, performance of the first type of virtual computing node and the second type of virtual computing node during execution of the application and while the one or more users interact with the application;
  based on monitoring the performance of the first type of virtual computing node and the second type of virtual computing node, determining, by the computing device, additional computing performance parameters of the cloud computing system representative of execution of the application by the cloud computing system in the second configuration;
  based on (i) the additional computing performance parameters, (ii) the first type of virtual computing node, and (iii) the second type of virtual computing, determining, by the computing device, to cease execution of the application by the cloud computing system in the second configuration; and
  providing, by the computing device and to the cloud computing system, an instruction to cease execution of the application.

19. The non-transitory computer-readable medium of claim 17, wherein the multiple types of virtual computing nodes comprise:
  a general purpose virtual computing node,
  a processing power optimized virtual computing node,
  a memory optimized virtual computing node,
  a storage optimized virtual computing node, and
  a network capacity optimized virtual computing node.

20. The non-transitory computer-readable medium of claim 17, wherein the computing performance parameters comprise:
  processor load;
  memory usage;
  response time;
  graphical processor load; and
  storage utilization.

21. The non-transitory computer-readable medium of claim 17, wherein operations further comprise:
  generating, by the computing device and using machine learning, a predictive model trained using multiple combinations of different types of virtual computing nodes executing one or more applications and measured computing performance parameters of the multiple combinations of virtual computing nodes while executing the one or more applications; and applying, by the computing device and to the predictive model, the second configuration within the cloud computing system.

22. The non-transitory computer-readable medium of claim 17, wherein operations further comprise:

monitoring, by the computing device, performance of the first type of virtual computing node and the second type of virtual computing node during execution of the application and while the one or more users interact with the application;

based on monitoring the performance, determining, by the computing device, additional computing performance parameters of the cloud computing system representative of execution of the application by the cloud computing system in the second configuration;

based on (i) the additional computing performance parameters, (ii) the first type of virtual computing node of the multiple types of virtual computing nodes, and (iii) the second type of virtual computing node of the multiple types of virtual computing nodes:

determining, by the computing device, to replace the first type of virtual computing node with another type of virtual computing node, and selecting, from among the multiple types of virtual computing nodes, a third type of virtual computing node; and providing, by the computing device and to the cloud computing system, an instruction to execute the application in the cloud computing system set to a third configuration comprising the third type of virtual computing node.

23. The non-transitory computer-readable medium of claim 17, wherein operations further comprise:

receiving, by the computing device and from a user, a request to execute the application on the cloud computing system, wherein the request includes a number of concurrent users of the application;

applying, by the computing device, the request to execute the application on the cloud computing system to one or more templates that each define a different configuration of different types of virtual computing nodes of the cloud computing system;

based on applying the request to the one or more templates, generating, by the computing device, a recommendation to execute the application on the first type of virtual computing node of the cloud computing system; and providing, for output by the computing device, the recommendation to execute the application on the first type of virtual computing node of the cloud computing system.

24. The non-transitory computer-readable medium of claim 23, wherein (i) determining, by the computing device, to execute the application within the cloud computing system set to a second configuration comprising a second set of virtual computing nodes, and (ii) selecting, from among multiple types of virtual computing nodes, a second type of virtual computing node to include in the second set of virtual computing nodes are further based on a comparison between a number of the users interacting with the application and the number of concurrent users specified in the request to execute the application.

\* \* \* \* \*